United States Patent Office 3,350,361
Patented Oct. 31, 1967

3,350,361
URETHANE POLYMERS AND METHODS OF APPLYING COMPOSITIONS CONTAINING THE POLYMERS
Edwin Fenton Chandley, Ernest Levy, and Arnold John Lowe, Eccles, Manchester, England, assignors to Lankro Chemicals Limited, Eccles, England, a British company
No Drawing. Filed July 26, 1963, Ser. No. 297,937
Claims priority, application Great Britain, July 31, 1962, 29,490/62
11 Claims. (Cl. 260—77.5)

The invention relates to novel urethane polymers and to methods of applying compositions containing these polymers, particularly to methods of treatment of leather.

It has been proposed to harden leather by impregnation with certain polyurethanes. In one proposal the leather was immersed in a solution containing an organic solvent, monomeric toluene diisocyanate and a polyoxyalkylene diol. In a second proposal leather was impregnated with castor oil and the latter reacted in situ with an organic compound having two or more isocyanate groups. In both proposals the leather was subsequently cured by a heat treatment.

Reaction products of organic diisocyanates with mixtures of polyoxyalkylene glycols and low molecular weight saturated aliphatic triols, such as trimethylol propane, have been suggested as stabe air-drying liquid coating compositions. Materials of this type have been applied to the surface of the leather to obtain a glossy or patent leather finish.

It has also been proposed to apply polyurethane solutions to the grain side of buffed unfinished leather to obtain a partial impregnation so that when the leather is finished by conventional methods it has a superior resistance to abrasion and an improved break. Break is a technical term well known to those versed in the art and refers to the manner of crease formation when the finished leather is bent to form a concave surface.

One class of polyurethane suggested for this purpose is the isocyanate terminated linear urethane polymers of molecular weight about 2000. Considerable success has been achieved by these processes on certain types of leather. There is, however, in many cases a tendency for the leather to harden under such treatment, and the amount of polyurethane applied may be critical; too little will not give the desired improvement in break or scuff resistance; too much will cause both hardening and the grain of the leather to crack when bent through an acute angle and subjected to impact.

These problems may be in part caused by the removal of the natural fats from the surface of the leather during the application of the polyurethane, and in part due to the cross linking of the leather fibres by reaction with isocyanate groups. Some partially successful attempts have been made to overcome this difficulty by employing with the polyurethane natural oils, such as neatsfoot oil and castor oil, as plasticisers.

It has also been proposed to treat leather with polyurethane formed from mixtures of difunctional isocyanates with mixtures of di and trifunctional alcohols, so as to obtain branched chain polyurethanes. It is possible with these materials to obtain a polyurethane with the necessary amount of branching to secure improvement in the break of the leather, but it is difficult to achieve this without any undesirable hardening of the leather.

It is an object of the present invention to provide urethane polymers which, in their preferred embodiments at least, have considerable latitude in the quantity that may be applied to leather and which achieve an improvement in break and scuff resistance without the same degree of attendant disadvantage of hardening.

According to the present invention there is provided a novel urethane polymer obtained by the reaction of a di or higher functional organic isocyanate with a mixture of one or more monohydric alcohols and one or more polyxyalkylene polyols which contain more than two hydroxyl groups. The mixture of alcohols may also contain a proportion of polyoxyalkylene diol. It is generally preferred that the polyol containing more than two hydroxyl groups is a triol.

It is generally desirable to employ greater amounts of the monohydric alcohol with the greater number of hydroxyl groups in the polyol.

The quantities of organic polyisocyanate normally required are such that there are between 1.3 and 2.5 isocyanate groups for each hydroxyl group present initially, and that the conditions of reaction are such that the free isocyanate content shall be between 1% and 10%, and preferably 1.5% to 4% by weight, at the end of the polymer-forming reaction.

When the polyol is an oxyalkylene triol the quantities of triol, diol and monohydric alcohol may be varied according to the following conditions:

Not less than 50% and not more than 85% of the hydroxyl groups originally present shall be in the form of a triol. Not less than 5% and not more than 35% of the hydroxyl groups originally present shall be in the form of a monohydric alcohol. Not more than 45% of the hydroxyl groups originally present shall be in the form of a diol.

At least one of the polyhydroxy compounds initially present should have a hydroxyl value of not greater than 112.

The polyoxyalkylene triol is preferably prepared by the polymerisation of 1:2 propylene oxide with a trihydric alcohol, such as glycerol, trimethanol propane, 1:2:6 hexane triol, as the initiators and potassium hydroxide as catalyst. The method of this preparation is well known. These triols, may have an average molecular weight within the range of 250 to 4000, as determined by their hydroxyl value, and preferably between 2500 and 4000.

The polyoxyalkylene diol may again be prepared by conventional methods, and with advantage may be the reaction product of 1:2 propylene oxide with water or a dihydric alcohol such as propylene glycol. The polyoxyalkylene diols preferably have a molecular weight within the range of 1000 to 3000. While it is preferred that the diols and triols should be made from 1:2 propylene oxide, they may also include a smaller proportion of ethylene oxide and/or butylene oxide.

The monohydric alcohols, which are an essential constituent of the polyurethanes of this invention, may be those represented by the formula $R(OC_nH_{2n})_yOH$, wherein R may be a hydrocarbon radical, $n$ may be 2, 3 or 4, and $y$ may be 0 or an integer between 1 and 50. R may be with advantage a butyl, isooctyl, a mixture of cetyl and oleyl groups, alkylaryl, or arylalkyl radical. Products containing cetyl-oleyl alcohol ($y=0$) have proved valuable. Of particular advantage are the condensation polymers of the alcohols and phenols of the formulae ROH with ethylene oxide and/or 1:2 propylene oxide.

Products of special value are the condensation products of ethylene oxide with cetyl-oleyl alcohol and ethylene oxide with nonyl phenol containing 5–15 moles and 8–15 moles of ethylene oxide respectively.

The poly-functional isocyanate employed to prepare the polyurethanes may be any of the isocyanate materials employed generally in the formation of polyurethanes. These include 2:4 toluene diisocyanate, mixtures of 2:4 and 2:6 toluene diisocyanate, diphenyl methane diisocyanate, m- and p-phenylene diisocyanates, dimethyl-diphenyl diisocyanates, diphenyl diisocyanate, naphthalene diisocyanate, and hexamethylene diisocyanate. The preferred isocyanate is the relatively pure toluene diisocyanate, containing approximately 80% of the 2:4 isomer and 20% of the 2:6 isomer.

The urethane polymer may be prepared by known methods by reacting the mixture of alcohols with a stoichiometric excess of a poly-functional isocyanate, preferably toluene diisocyanate, under conditions which avoid secondary reactions of free isocyanate groups with urethanes and ureas formed respectively by the initial reaction of isocyanate groups with hydroxyl groups and small amounts of water that may be present in the system.

The quantity of organic diisocyanate is adjusted to ensure that the resulting polymer, prepared according to the method given below, possesses terminal isocyanate groups. It is preferred that the novel polymers of this invention contain not less than 1% unreacted isocyanate groups, and not more than 10% unreacted isocyanate groups. It is even more preferable that the percentage of free isocyanate shall lie in the region of 1.5% to 4% by weight. By unreacted isocyanate groups we mean the weight of unreacted isocyanate groups (NCO) expressed as a weight percentage of the total weight of the polymer.

The respective quantities of polyisocyanate and alcohols in the mixture to be reacted are present in amounts such that the initial ratio of isocyanate groups to hydroxyl groups is between 13:10 and 25:10.

The respective quantities of reactants may be calculated as follows:

Let the alcohol mixture to be reacted with the isocyanate contain $m$ grams of monohydric alcohol with a hydroxyl value $H'$
$d$ grams of diol with a hydroxyl value $H''$
$t$ grams of triol with a hydroxyl value $H'''$ Let the weight percentage of water in the mixed alcohols be $h$.

Let the polyfunctional isocyanate have a molecular weight $p$, and possess $y$ isocyanate groups on average per molecule.

Let the amount in grams of polyfunctionel isocyanate to react with all the hydroxyl groups be $q$.

Then $$q = (mH' + dH'' + tH_2''')(p/56100y) + (m+d+t)(2hp)/(1800y)$$

Then assuming $h$ is small, the total weight of reactants for equimolar reaction is $m+d+t+q$.

If $x\%$ of free isocyanate groups are required at the end of the reaction and the additional weight of poly-functional isocyanate to give this excess is $i$ grams, then the total weight of the product $=(m+d+t+q+i)$ grams. The weight (grams of unreacted NCO groups equals $$(m+d+t+q+i)(x)/(100)$$

$$\therefore i = (m+d+t+q+i)\frac{(Px)}{(4200y)}$$

i.e. $i = \frac{(m+d+t+q)(Px)}{(4200y - Px)}$

The total quantity of poly-functional isocyanates required is $(q+i)$ grams. In practice the quantity of isocyanate used has to be varied slightly according to the process condition used to manufacture the prepolymer. It is often desirable to take about 96–97% of the calculated quantity $(q+i)$.

The reaction conditions under which the urethane polymers may be prepared can be varied considerably. One convenient method is to heat the mixture of alcohols and isocyanates, raising the temperature slowly over a period of 40 minutes to 105° C., and maintaining the mixture at this temperature for 120 to 150 minutes. The reaction should be stirred and maintained under an atmosphere of nitrogen. After completion of the reaction period, the polymer is cooled and stored under anhydrous conditions.

It is desirable that the monohydric alcohol diol and triol components should be of pure commercial qualities, and where possible a "polyurethane prepolymer grade."

By "polyurethane prepolymer grade" it is intended to convey that the total alkaline plus alkaline earth metal contents of the alcohols should preferably not exceed 3 parts per million, and that the acid value should be low and the water content should preferably not exceed 0.1% by weight. The polymer may optionally be stabilised during production and storage by the addition of small quantities of an acyl chloride, e.g. acetyl chloride or benzoyl chloride.

The polymer prepared above contains reactive isocyanate groups. In the absence of a mono functional alcohol, a polymer prepared from a diol would have two functional isocyanate groups; and that from a triol would have three. These isocyanate groups are capable of reacting further with active hydrogen atoms such as are present in water, alcohol groups or amine groups. The addition of the monohydric alcohol to the polymer mixture leads to the blocking of one potential point of growth. This blocked chain has the important function of acting as an internal, nonmigratory plasticiser for the urethane polymer, and, it is believed, is the reason that the polymers prepared according to the present invention may be used to treat leather to obtain improvement in break and scuff resistance without an increase in hardness.

The present invention also includes a method of treating leather, which method comprises applying to the leather to be treated a solution of a polyurethane polymer as described above, the solvent being one which is substantially non-reactive to isocyanates. The solvents most suitable for this purpose are aromatic hydrocarbon fractions such as toluene or xylene. Other solvents which may be used are the acetate of ethylene glycol-monoethyl ether; other esters; ketones such as methyl ethyl ketone and methyl isobutyl ketone. The solvent should be substantially dry, i.e. not much more than 0.01% by weight of water, and should be free from compounds possessing hydroxyl groups, carboxyl groups, amine groups and in general groups containing active hydrogen atoms which would react in an undesirable manner with the free isocyanate of the polymer, leading to premature gellation and loss of activity.

It is preferred that the solution employed for coating leather shall contain 1–5 parts, and still more preferably 1–3 parts by weight of solvent for each part by weight of polymer.

The preferred solvent is a high flash point aromatic hydrocarbon solvent. The solution of urethane polymer may be applied to the leather, usually to its grain side when normally ready for finishing, by means of a paint roller or equivalent mechanical device, such as a seasoning or similar machine. Alternatively the solution may be applied by spraying or padding.

While the polyurethane may be applied with great advantage to the treatment of corrected grain full chrome side leather and corrected grain chrome retan leather for use in the production of shoe upper leather, it is not limited to this particular use. Other leathers which may be treated with advantage are full chrome goatskin; full chrome pigskin; sheepskin clothing leather; a variety of fancy leathers from sheepskins; vegetable tanned upholstery leather; vegetable tanned case leather.

It will be appreciated that leather varies considerably not merely from type to type but across an individual hide. The selection of polymer composition can be varied to suit individual leathers according to their origin and treatment prior to the application of the urethane polymer solution. The quantity of polyurethane to be applied may also be varied but with advantage may be between 2 grams and 7 grams of solvent free polyurethane per square foot of leather.

Optionally the urethane solution may incorporate up to 100% by weight of raw oil, such as cold test neatsfoot oil or sperm oil, the amount of raw oil being calculated on the solvent-free polymer. If desired, suitably dispersed pigments may be incorporated in the urethane solution or suitable dyestuffs dissolved in it, thus giving the advantage of combining impregnation with some surface colouring in one operation.

The leather for treatment in accordance with the invention is taken when it would be normally ready for finishing. It is generally recommended that the leather be plated, prior to impregnation, with a smooth plate on a hydraulic press or similar device, e.g. at a 200 kg. per $cm.^2$ pressure and 75° C. temperature. It is generally desirable to apply the first finishing coat after evaporation of the solvent but within 24 hours of the application of the urethane solution. Depending on the type of leather, plating may also be given after the evaporation of the solvent and prior to the first finishing coat. The first finishing coat may be, and is advantageously so in many cases, a base or sealing coat. The impregnation of the leather does not impose any restriction on the type of finish with which the leather may be subsequently dressed. Conventional finishing systems using, for example, binders based on synthetic resin polymer emulsions and/or soluble protein materials with dispersed pigments and/or finishes based on nitrocellulose, are perfectly suitable.

Tests as applied to leather

The leather treated with urethane polymers was tested as follows:

(a.1) *Test for grain cracking by the falling weight method.*—The apparatus consists of a vertical metal rod to serve as a guide for the falling weight of 0.85 lb. in the shape of a cylinder 2" diameter and 1" high with a central bore.

The rod rests on a felt pad and carries 8 marks every 10 cms., the first mark being 10 cms. above the felt. The leather is double folded and placed on the felt with the apex of the double fold touching the rod. The weight is lifted to the first mark and allowed to drop and the apex of the double fold inspected for grain crack. If there is no grain crack the weight is lifted to the second mark, and so on until inspection shows that the grain has cracked.

The height from which the weight must fall to produce grain crack is recorded as the result of the test.

(a.2) *Test for grain cracking by the lastometer.*—The type of the lastometer used in this test is described in the "Official Methods of Analyses" of the Society of Leather Trades Chemists, 2nd revised edition, 1951, page 170.

(b) *Test for scuff resistance.*—The apparatus consists of a pendulum pivoted above the sample, carrying at its lower end the striking or scuffing tool. This is a rod made of a type of tool steel and has a rounded lower edge for striking the leather. The rounding of this edge forms approximately a ¼ circle of radius about ⅟₆₀". A strip of leather is so placed under the pendulum, on a rubber base, that the long dimension of the strip is in the same plane as that in which the pendulum swings. By putting metal strips under the leather it is arranged that the swinging pendulum scuffs the leather at a certain depth. For the test, the pendulum is raised to the horizontal position in one direction and allowed to strike the leather; it is then raised to the horizontal position in the other direction and allowed to strike the leather again. Subsequent sample areas of the leather are in this manner scuffed four times, eight times, sixteen times etc., in geometric progression. The contrast between the scuffed and unscuffed areas is assessed by means of the "Geometric Grey Scale for Assessing the Effect on the Pattern," issued by the Society of Dyers' and Colourists. On this scale a reading of 0–1 represents complete removal of the surface of the leather and 5 represents little or no removal.

(c) *Assessment of break.*—This was made on an arbitrary linear scale, zero denoting a very fine break which is desirable, and 5 denoting a moderately coarse break. Samples were compared with untreated leather and the results expressed by a panel of assessors.

(d) *Hardness and plasticity.*—Hardness was measured according to the British Standard method. For testing the plasticity the leather samples were mounted in the machine and two points on each sample 100 mm. apart were indicated by markers. The leather sample was then stretched at a constant rate of 11" per minute until the two marks on each sample were 110 mm. apart and the samples were held in this condition for one hour. The leather samples were then taken out of the machine. After 24 hours the distances of the two marks on each sample were measured again and the remaining (plastic) elongations stated in millimeters.

(e) *Resilience test.*—Resilience was measured in a manner similar to the methods suggested by J. A. Wilson, J.A.L.C.A., 1929, 112 and also independently by F. English, Collegium 31, 201. Leather strips 100 mm. x 30 mm. were bent with a ring to a circumference of 100 mm.; mounted on a wooden block with the joining edge on the block and loaded on the top with a 100 gm. weight. The depression caused by this load was measured.

In order to minimise variations due to variability of leather all the samples were applied to pieces of leather 6" square cut from the same full chrome side of leather. A piece of leather measuring 48" x 18" was cut from the side of leather so that the long axis was parallel to the backbone. This yielded three rows of samples measuring 6" x 6", i.e. 24 samples in all. The middle row of samples were untreated and regarded as control blanks. The remaining pieces were sprayed with urethane polymers in the form of 33% solutions in solvents so as to give 2.2 gms. of solvent-free polymer per sq. ft. (light application described as L hereafter), 5.0 gms./sq. ft. (medium application described as M hereafter) and 7.0 gms./sq. ft. (heavy application described as H hereinafter). In all cases the untreated and treated leather was finished in the same conventional manner after the urethane solvent had been allowed to evaporate for 24 hours. The finish comprised several coats containing pigment and an acrylic resin emulsion followed by a spray coat of nitrocellulose emulsion and finally by a tinted spray coat of high flash nitrocellulose lacquer. The samples selected for treatment were chosen at random from the top and bottom rows, but for assessment were compared with the adjacent blanks from the middle row.

Following is a description by way of example of methods of carrying the present invention into effect.

EXAMPLE 1A

A urethane polymer (1A) was prepared by charging 4500 g. of a glycerol based polyoxypropylene triol (1.5 moles; 4.5 equivalents); 389 g. of a mixture of cetyl alcohol and oleyl alcohol (1.5 moles; 1.5 equivalents); and 3000 g. of a polyoxypropylene diol (1.5 moles, 3.0 equivalents) to a 10-litre flask fitted with a stirrer, thermometer pocket and inlet to the vapour space for dry nitrogen. The water content of the mixture was raised to 0.1% by weight based on this charge by the introduction of a small quantity of water. The mixture was heated by means of an electric mantle to 35–40° C. with continuous stirring until dissolution of the cetyl and oleyl alcohols and water was complete. 1192 g. of 80/20 toluene diisocyanate (6.85 moles; 13.7 equivalents) was introduced at this point, the whole reaction mixture being heated and stirred under a dry nitrogen blanket with a temperature rise of approximately 2° C. per minute for 35 mins. until a temperature of 105° C. was attained. This temperature was maintained for a period of 130 minutes, at which point the viscosity of the mixture was 160 centipoises (at 105° C.) and the free isocyanate content was steady at 2.2% by weight. The free isocyanate content of the reaction mixture was determined on a 5 g. sample by reaction with di-n-butylamine.

The reaction flask was removed from the heating mantle and cooled in a cold water bath to approximately 50° C. before discharging.

The undiluted polymer (1A) had a viscosity at 25° C. of 13,700 centipoises as measured by the Brookfield Viscometer. On dilution of 1 part by weight of polymer with 2 parts by weight of Shellsol A (registered trade name), a high flash aromatic solvent, the viscosity of the solution was 19 centipoises, at 25° C.

EXAMPLE 1B

A urethane polymer (1B) was prepared by reacting 4500 g. (1.5 moles or 4.5 equivalents) of polyoxypropylene triol based on glycerol, 1154 g. (1.5 moles or 1.5 equivalents) of a condensate of nonyl phenol with about 13 moles of ethylene oxide (molecular weight 769), 3000 g. of polyoxypropylene diol (1.5 moles or 3.0 equivalents) and 1229 g. of 80/20 toluene diisocyanate (7.06 moles or 14.1 equivalents) under the conditions described in Example 1A except that after removal from the heating mantle the reaction mixture was cooled to 80° C. and 30 parts by weight of Shellsol A was added to 100 parts of the hot polymer. The solution was then cooled to 50° C. and discharged to a second vessel where 130 parts by weight of solution were mixed with 170 parts of Shellsol A. The resulting solution had a free NCO content of 0.75% and a viscosity of 19.0 centipoises. The solvent-free polymer obtained from this solution had a viscosity of 167 centipoises at 105° C.; 13,600 centipoises at 25° C. and a free NCO content of 2.25%.

EXAMPLE 1C

A urethane polymer (1C) was prepared by reacting 4500 g. (1.5 moles or 4.5 equivalents) of a glycerol based polyoxypropylene triol, 111 g. of anhydrous n-butanol, (1.5 moles or 1.5 equivalents), 3000 g. of polyoxypropylene diol (1.5 moles or 3.0 equivalents) and 1.177 g. of 80/20 toluene diisocyanate (6.76 moles; 13.52 equivalents).

The polymer was made according to the method used in Example 1A except that as all the alcohols were liquid they were mixed at 20° C. and the isocyanate was added at this temperature. The heating up period to 105° C. took 40 mins. Subsequent procedure was as described in Example 1A.

The resulting undiluted polymer 1C had a viscosity at 25° C. of 10,080 centipoises and a free isocyanate content of 2.1% by weight.

The corresponding viscosity at 25° C. for the diluted prepolymer solution resulting from a mixture of 1 part by weight of polymer and 2 parts by weight of Shellsol A was 18 centipoises.

EXAMPLE 1D

A urethane polymer (1D) was prepared by reacting 750 g. (0.25 mole or 0.75 equivalent) of a glycerol based polyoxypropylene triol, 440 g. (0.25 mole or 0.25 equivalent) of a condensate of nonyl phenol with approximately 35 moles of ethylene oxide, 500 g. of a polyoxypropylene diol (0.25 mole or 0.5 equivalent) and 216 g. of 80/20 toluene diisocyanate (1.245 mole or 2.49 equivalent) under the conditions described in Example 1A except that the reaction mixture was heated to 45° C. before addition of the toluene diisocyanate. The heating up period to 105° C. took 30 minutes and reaction was continued for 2 hours at this temperature. The reaction product had a viscosity of 380 centipoises at 105° C. and a free isocyanate content of 2.3% by weight. A sample of the product cooled to room temperature set to a translucent paste. Dilution of 1 part by weight of the polymer with 2 parts by weight of Shellsol A was therefore carried out after cooling the reaction product to 80° C. as described in Example 1B. The solution of polymer in Shellsol A which was slightly turbid at room temperature, had a free isocyanate content of 0.77% by weight and a viscosity of 37 centipoises at 25° C.

EXAMPLE 2

Leather treated with the products of Examples 1A, 1B, 1C and 1D, was compared with untreated leather, leathers treated with a commercial material designated as Sample A and believed to be an isocyanate terminated linear polyether based urethane and Sample B which was urethane polymer containing no monohydric alcohol made according to the following procedure:

3000 g. (1.0 mole or 3.0 equivalent) of a glycerol based polyoxypropylene triol, 2000 g. (1.0 mole or 2.0 equivalent) of polyoxypropylene diol and 756 g. of 80/20 toluene diisocyanate (4.35 moles; 8.7 equivalents) were reacted together according to the method described in Example 1C. After reacting at 105° C. for 125 minutes the viscosity of the polymer was 178 centipoises (at 105° C.). On cooling to 25° C. the polymer had a viscosity of 12,400 centipoises and a free isocyanate content of 2.6% by weight.

An evaluation showed that all treated samples, including those using Samples A and B, had a very marked improvement in break at all levels of application. Examination of scuff resistance gave the following results at medium levels of application. Readings on Grey Scale.

| Sample | No. of Scuff Strokes | | |
|---|---|---|---|
| | 16 | 8 | 4 |
| Average untreated | 1 | 2 | 3 |
| A (M) | 5 | 4.5 | 4 |
| B (M) | 5 | 5 | 5 |
| 1A (M) | 4.5 | 4.5 | 4.5 |
| 1B (M) | 4.5 | 4.5 | 4 |
| 1C (M) | 5 | 4.5 | 4 |
| 1D (M) | 3 | 3 | 4.5 |

At the high level of application all samples showed great resistance to scuff whilst tests at the lowest level of application showed a great improvement over untreated leather, but one which was not optimum.

| Sample | No. of Scuff Strokes | | |
|---|---|---|---|
| | 16 | 8 | 4 |
| Untreated | 1 | 2 | 3 |
| A,L | 2.5 | 3.5 | 3.5 |
| 1A,L | 3 | 4 | 5 |

British Standard Hardness Test did not show any significant difference between treated and untreated samples the penetration being 78 mms. on average with uncorrelated deviation of ±5 mm.

In a similar manner, the plasticity tests failed to reveal undesirable hardening of the leather on treatment. The untreated leather showed an extension on average of 5.5 mms. whilst all samples of treated leather varied randomly between 4 and 7 mm.

The Lastometer tests showed the Samples A and B were inferior at grain crack but that the differences were more marked in the rapid impact method of the falling weight. The table below gives the height of fall necessary to product grain crack. "N.T." signifies "not tested."

| Polymer | Level of Application | | |
|---|---|---|---|
| | Low | Medium | High |
| A | 40 | 30 | 20 |
| B | 80 | 30 | 40 |
| 1A | 50 | ¹80 | ¹80 |
| 1B | NT | ¹80 | NT |
| 1C | NT | ¹80 | NT |
| 1D | NT | ¹80 | NT |

¹ Over.

Seven out of the eight blanks of non-treated leather did not show grain crack when the falling height of the weight was 80 cms., the remaining eighth sample showed a slight grain crack from a falling height of 50 cms. upwards.

*Preparation of polymer Sample C*

A urethane polymer Sample C, differing in constitution from the polymers described in the Examples 1A to 1D in that the composition does not include a polyoxypropylene diol component was prepared as follows:

A polyoxypropylene triol based on glycerol 4,500 (1.5 moles or 4.5 equivalents), and 233 of a mixture of cetyl and oleyl alcohols (0.9 mole; 0.9 equivalent) were heated together at 35° C. in order to form a homogeneous solution. 714 gms. of 80/20 toluene diisocyanate (4.1 moles; 8.2 equivalents) was added and the reaction continued in the manner described in Example 1A. After allowing the reaction to proceed for 125 minutes at 105° C. the reaction mixture was cooled to 25° C. The resulting polymer had a viscosity of 208 centipoises. The free isocyanate content of the polymer was 2.18% by weight.

EXAMPLE 3

The polymer Sample C was applied to the grain side of chrome shoe upper leather by means of a paint roller from the solution containing 33% w./w. of the polymer. After the evaporation of the solvent the uptake of solvent free polymer was found to be 4 sq. ft. After finishing the leather by the means described in Example 2, the leather showed a marked improvement with regard to tightness of break and scuff resistance when compared with the untreated leather. Although the "break" improved over a period of five days, the leather did not harden appreciably and remained supple.

EXAMPLE 4

The grain side of a vegetable tanned upholstery leather was plated at 80° C. and sprayed with a 20% solution of polyurethane 1B and, after drying, had gained 8.5 per sq. ft. After application, the leather was stoved for 25 mins. at 50° C.–60° C. in an oven and finished in the manner described in Example 2. The finished leather, although showing improved break and scuff resistance compared with the untreated leather, remained supple and did not show tendencies to grain crack.

EXAMPLE 5

A solution was prepared which contained 25 parts by weight of the solvent-free urethane polymer Sample C, 5 parts by weight of cold test neatsfoot oil and 70 parts by weight of "Shellsol A." It was applied by roller to the grain side of a corrected grain chrome shoe upper leather. After hanging the leather overnight in a ventilated room at 20° C. the gain in weight was found to be 5 gms./sq. ft. The leather was finished in the manner described in Example 2, and found to be supple and free of grain crack. It had a considerable improved break and resistance to scuff when compared with the untreated leather finished by similar means.

EXAMPLE 6

Chrome shoe upper leather was treated by means of a paint roller with a 33% solution of the polymer prepared according to Example 1A. The uptake of solvent-free polymer was at the rate of 5.2 g. per sq. ft. The finished leather showed a marked improvement with regard to tightness of break and resistance to scuff as compared with the same leather finished in the same manner but without a treatment with polyurethane polymer solution.

EXAMPLE 7

Chrome shoe upper leather was treated by means of a paint roller with a 33% solution of the polymer prepared according to Example 1B. The uptake of solvent-free polymer was at the rate of 8.8 g. per sq. ft. The finished leather showed a marked improvement with regard to tightness of break and resistance to scratch as compared with the same leather finished in the same manner but without a treatment with polyurethane polymer solution.

EXAMPLE 8

The grain side of an undyed corrected grain chrome shoe upper leather was plated at 80° C. and treated by means of a paint roller with a mixture of the following composition: 100 parts polyurethane=33% solution, Example 1A plus 20 parts of a 70% dispersion of titanium dioxide ground in a phthalate plasticiser.

The uptake of solvent-free polymer plus pigment dispersion was found to be approximately 4 g. per sq. ft. The leather was allowed to dry for 24 hours in a ventilated room at a temperature of 20° C. After finishing the leather as described in Example 2 it showed a marked improvement with regard to tightness of break and scuff resistance when compared with the untreated leather. The advantage of incorporating white pigment in this manner was that the green colouration often associated with impregnated full chrome leather was masked, and finishing into white was possible without resorting to excess of pigmentation of the subsequent aqueous finish.

EXAMPLE 9

The grain side of corrected grain chrome shoe upper leather was plated at 80° C. and treated by means of a paint roller with a mixture of the following composition: 100 parts polyurethane 33% solution Example 1A plus 20 parts of an 80% dispersion of ilmenite ground in a phthalate plasticiser.

The uptake of solvent-free polymer plus pigment dispersion was approximately 4 g. sq. ft. The leather was allowed to dry for 24 hours in a well ventilated room at 20° C. As a result of the impregnation with the pigmented urethane solution the grain surface was strongly coloured and formed a good base for subsequent finishing into black which was carried out as described in Example 2.

The finished leather showed a marked improvement with regard to tightness of break and scuff resistance when compared with the untreated leather.

EXAMPLE 10

A urethane polymer was prepared by reacting 100 grams (0.575 mole; 1.15 equivalents) of 80/20 toluene diisocyanate with a mixture containing 600 grams (0.2 mole or 0.6 equivalent) of a polyoxypropylene triol based on glycerol and 100 grams (0.1 mole; 0.1 equivalent) of a mono butoxy polyoxyalkylene monohydric alcohol, in the presence of 0.1% by weight of water based on the hydroxyl containing components. The oxyalkylene portion of the monohydric alcohol consisted of 90% by weight oxypropylene units and 10% by weight oxyethylene units present in the terminal position. The reaction was complete in 2 hours, the free isocyanate content of the product being 2.0% by weight.

The polymer was applied as a 33% by weight solution to the grain side of chrome upper shoe leather by means of a roller. At an uptake of solvent-free polymer corresponding to 4 grams per sq. ft., the finished leather exhibited improved tightness of break and scuff resistance when compared with the untreated leather.

EXAMPLE 11

A urethane polymer was prepared by the following procedure: 3,000 g. (1 mole; 3 equivalents) of a polyoxypropylene triol based on glycol and 250 g. (0.25 mole; 0.25 equivalent) of a butoxy polyoxypropylene monohydric alcohol were mixed with 7,370 g. of Shellsol A. Water and Shellsol A were removed from the system by azeotropic distillation at 100–110° C. under 100–120 mm. Hg pressure. Dry Shellsol A equivalent in quantity to that distilled was replaced in the system before addition of 435 gms. 80/20 toluene diisocyanate (2.5 moles; 5.0 equivalents). The addition of the 80/20 toluene diisocyanate was made at 105° C., blanketing the reaction mixture with dry nitrogen during this and the subsequent reaction period. The temperature of the reaction mixture was maintained at 105° C. for 4 hours. On cooling to room temperature the polymer solution (33.3% solids content) had a free isocyanate content of 1.0% by weight and a viscosity of 6.9 centistokes at 25° C.

The polymer solution was applied by spraying the grain side of chrome upper shoe leather. The uptake of solvent-free polymer was 4 g. per sq. ft. The leather was finished in the manner described in Example 2, and showed considerable improvement with regard to the tightness of break and scuff resistance when compared with the untreated leather.

We claim:

1. A polyurethane polymer having a free isocyanate content of between 1% and 10% by weight, said polymer being prepared by the reaction of (1) an organic isocyanate having at least two isocyanate groups with (2) a mixture of alcohols comprising (i) a monohydric alcohol having a molecular weight of at least 74 and having the formula $R(OC_nH_{2n})_yOH$ wherein R is a hydrocarbon radical having at most 18 carbon atoms, $n$ is an integer of from 2 to 4, and $y$ is an integer of from 0 to 50, and (ii) a polyoxyalkylene polyol having more than two hydroxyl groups and having a molecular weight of from 250 to 4000, the amount of organic isocyanate present initially being such that there are between 1.3 and 2.5 isocyanate groups for each hydroxyl group initially present.

2. A polyurethane according to claim 1 wherein the polyol containing more than two hydroxyl groups is a triol having an average molecular weight of from 2500 to 4000.

3. A polyurethane according to claim 1 wherein the mixture of alcohols additionally contains a polyoxyalkylene diol having a molecular weight of from 1000 to 3000, and wherein the quantities of triol, diol and monohydric alcohol are such that at least 50% and less than 85% of the hydroxyl groups originally present are provided by the triol, at least 5% and less than 35% of the hydroxyl groups originally present are provided by the monohydric alcohol and less than 45% of the hydroxyl groups originally present are provided by the diol.

4. A polyurethane treated crusted leather prepared by treating the grain side of the leather with a polyurethane polymer having a free isocyanate content of between 1% and 10%, by weight, said polymer being prepared by the reaction of (1) an organic isocyanate having at least two isocyanate groups with (2) a mixture comprising (i) a monohydric alcohol having a molecular weight of at least 74 and having the formula $R(OC_nH_{2n})_yOH$ wherein R is a hydrocarbon radical having at most 18 carbon atoms, $n$ is an integer of from 2 to 4, and $y$ is an integer of from 0 to 50, and (ii) a polyoxyalkylene polyol having more than two hydroxyl groups and having a molecular weight of from 250 to 4000, the amount of organic isocyanate present initially being such that there are between 1.3 and 2.5 isocyanate groups for each hydroxyl group initially present.

5. A polyurethane treated crusted leather according to claim 4 wherein R is a radical selected from the group consisting of butyl, isooctyl, a mixture of cetyl and oleyl groups, alkylaryl and arylalkyl radicals.

6. A polyurethane treated crusted leather according to claim 4 wherein the monohydric alcohol includes a mixture of cetyl and oleyl alcohols.

7. A polyurethane treated crusted leather according to claim 4 wherein the polyol containing more than two hydroxyl groups is a triol.

8. A polyurethane treated crusted leather according to claim 7 wherein the triol is selected from the group consisting of the propylene oxide adduct of glycerol, trimethanol propane or 1,2,6-hexane triol.

9. A polyurethane treated crusted leather according to claim 7 wherein the triol has an average molecular weight in the range of from 2500 to 4000.

10. A polyurethane treated crusted leather according to claim 4 wherein the mixture of alcohols additionally contains a polyoxyalkylene diol having a molecular weight of from 1000 to 3000.

11. A polyurethane treated crusted leather according to claim 10 wherein the quantities of triol, diol and monohydric alcohol are such that at least 50% and less than 85% of the hydroxyl groups originally present are provided by the triol, at least 5% and less than 35% of the hydroxyl groups originally present are provided by the monohydric alcohol and less than 45% of the hydroxyl groups originally present are provided by the diol.

References Cited

UNITED STATES PATENTS

| | | | |
|---|---|---|---|
| 3,012,993 | 12/1961 | Rogan | 260—77.5 |
| 3,027,276 | 3/1962 | Cohen et al. | 117—142 |
| 3,030,951 | 4/1962 | Mandarino | 128—92 |
| 3,047,520 | 7/1962 | Fiel | 260—18 |
| 3,061,470 | 10/1962 | Kuemmerer | 117—138.8 |
| 3,066,997 | 12/1962 | Neher et al. | 8—94.21 |
| 3,119,716 | 1/1964 | Wooster | 117—142 |
| 3,178,310 | 4/1965 | Berger et al. | 117—142 |
| 3,189,578 | 6/1965 | Kuemmerer | 260—77.5 |
| 3,194,773 | 7/1965 | Hostettler | 260—2.5 |
| 3,248,371 | 4/1966 | Damiusis | 260—77.5 |
| 3,282,726 | 11/1966 | Seligsberger | 117—68 |

FOREIGN PATENTS 210,411   7/1957   Australia.

DONALD E. CZAJA, *Primary Examiner.*

F. McKELVEY, *Assistant Examiner.*